United States Patent
Samrao et al.

(10) Patent No.: US 6,937,621 B2
(45) Date of Patent: Aug. 30, 2005

(54) APPARATUS AND METHOD FOR DETERMINING BYTE GAIN AND LOSS ADJUSTMENTS IN A SONET/SDH NETWORK ELEMENT

(75) Inventors: Gurmohan Singh Samrao, San Jose, CA (US); Christopher Bergen, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 880 days.

(21) Appl. No.: 09/790,301

(22) Filed: Feb. 21, 2001

(65) Prior Publication Data

US 2002/0114357 A1 Aug. 22, 2002

(51) Int. Cl.[7] .................................................. H04J 3/06
(52) U.S. Cl. ........................................ 370/516; 370/503
(58) Field of Search ................................. 370/369, 375, 370/503, 504, 505, 506, 516

(56) References Cited

U.S. PATENT DOCUMENTS

| | | | | |
|---|---|---|---|---|
| 5,390,180 A | * | 2/1995 | Reilly | 370/476 |
| 5,598,445 A | * | 1/1997 | Castano Pinto et al. | 375/372 |
| 5,708,684 A | * | 1/1998 | Ueda | 375/358 |
| 6,650,637 B1 | * | 11/2003 | Bansal et al. | 370/360 |
| 6,751,238 B1 | * | 6/2004 | Lipp et al. | 370/541 |
| 2001/0015839 A1 | * | 8/2001 | Koh et al. | 359/128 |

* cited by examiner

Primary Examiner—Duc Ho
Assistant Examiner—Thien D Tran
(74) Attorney, Agent, or Firm—Victor H. Okumoto

(57) ABSTRACT

An apparatus and method determine byte gain and loss adjustments that compensate for frequency differences between ingress and egress data rate signals in a SONET/SDH NE. The count of ingress data rate signal pulses at the time that data is requested by a switch fabric is compared to the count of egress data rate signal pulses at the time the requested data is passed through the switch fabric. If a delta phase equal to the difference in counts less a reference phase, is continuously greater than a positive value threshold for at least a time threshold period, then a byte gain adjustment is determined. On the other hand, if the delta phase is continuously less than a negative value threshold for at least the time threshold period, then a byte loss adjustment is determined.

20 Claims, 9 Drawing Sheets

APPARATUS AND METHOD FOR DETERMINING BYTE GAIN AND LOSS ADJUSTMENTS IN A SONET/SDH NETWORK ELEMENT

FIELD OF THE INVENTION

The present invention generally relates to SONET/SDH network elements and in particular, to an apparatus and method for determining byte gain and loss adjustments compensating for frequency differences between ingress and egress data rate signals in a SONET/SDH network element.

BACKGROUND OF THE INVENTION

In a synchronous optical network (SONET) or synchronous digital hierarchy (SDH) network element (NE), the receive line SONET/SDH clock recovered in an ingress line card may have a slightly different frequency than the transmit system SONET/SDH clock in an egress line card, thereby requiring periodic adjustment of the pointer bytes in outgoing SONET/SDH frames. Determination of the appropriate adjustment, however, may be complicated by the presence of a switch fabric coupling the ingress and egress line cards. Particularly where the switch fabric operates asynchronous to the ingress and egress line cards, experiences jitter across the switch fabric, performs hybrid switching functions such as switching time division multiplexed (TDM) and non-TDM traffic simultaneously across the switch fabric, and exists in a multi-shelf environment where ingress and egress line cards can reside in two physically separated shelves of the SONET/SDH NE.

OBJECTS AND SUMMARY OF THE INVENTION

Accordingly, one object of the present invention is an apparatus and method for determining byte gain and loss adjustments compensating for frequency differences between ingress and egress data rate signals in a SONET/SDH network element.

Another object of the present invention is an apparatus and method for determining such byte gain and loss adjustments that accommodate an interposing switch fabric.

These and additional objects are accomplished by the various aspects of the present invention, wherein briefly stated, one aspect of the invention is an apparatus for determining byte gain and loss adjustments compensating for frequency differences between ingress and egress data rate signals in a SONET/SDH network element, comprising: a first counter generating a first count indicative of a frequency of an ingress data rate signal upon each request to transmit data to a switch fabric; a second counter generating a second count indicative of a frequency of an egress data rate signal; and an instantaneous phase generator generating an instantaneous phase from a difference between the first and second counts so as to indicate frequency differences between the ingress and egress data rate signals upon passing the data through the switch fabric.

Another aspect is an apparatus for determining byte gain and loss adjustments compensating for frequency differences between ingress and egress data rate signals in a SONET/SDH network element, comprising: means for generating a first count indicative of a frequency of an ingress data rate signal upon each request to transmit data to a switch fabric; means for generating a second count indicative of a frequency of an egress data rate signal; and means for generating an instantaneous phase from a difference between the first and second counts so as to indicate frequency differences between the ingress and egress data rate signals upon passing the data through the switch fabric.

Another aspect is a method for determining byte gain and loss adjustments compensating for frequency differences between ingress and egress data rate signals in a SONET/SDH network element, comprising: generating a first count indicative of a frequency of an ingress data rate signal upon each request to transmit data to a switch fabric; generating a second count indicative of a frequency of an egress data rate signal; and generating an instantaneous phase from a difference between the first and the second counts so as to indicate frequency differences between the ingress and egress data rate signals upon passing the data through the switch fabric.

Additional objects, features and advantages of the various aspects of the present invention will become apparent from the following description of its preferred embodiment, which description should be taken in conjunction with the accompanying drawing.

DETAILED DESCRIPTION OF THE PREFERRED EMBODIMENT

The following description and claimed invention are applicable to both synchronous optical network (SONET) and synchronous digital hierarchy (SDH) network elements and components. Accordingly, to simplify the following description and claims, it is to be understood that the term SONET, as used herein, shall be interpreted as including both SONET and SDH.

Figure 1:
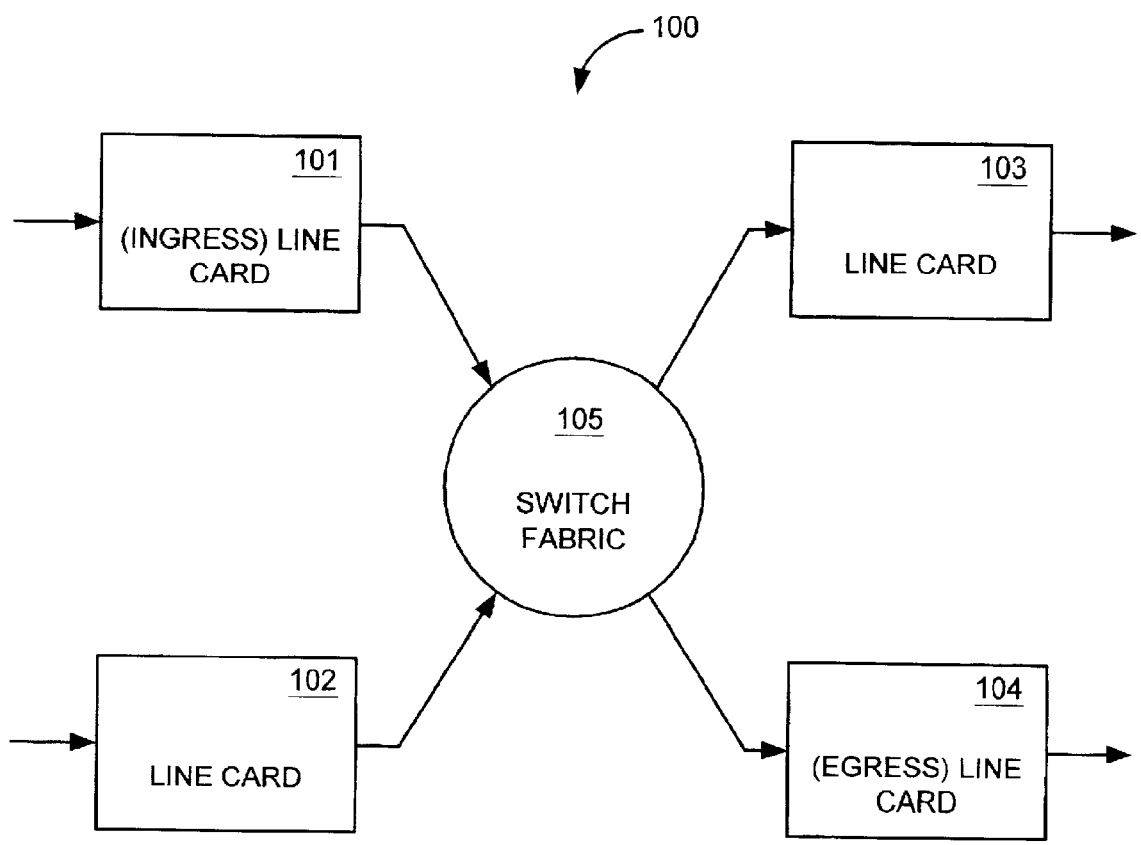
FIG. 1 illustrates a block diagram of a SONET NE.

FIG. 1 illustrates a block diagram of a SONET NE 100. The SONET NE 100 includes line cards 101~104 and a switch fabric 105. The line card 101 is denoted an ingress line card, because data enters the SONET NE 100 through it. The line card 104, on the other hand, is denoted an egress line card, because data exits the SONET NE 100 through it. The switch fabric 105 serves to route data passing through the SONET NE 100 from an ingress line card to the proper egress line card. Each of the line cards 101~104 may function as an ingress or egress line card, depending upon whether it is receiving or transmitting data.

Figure 2:
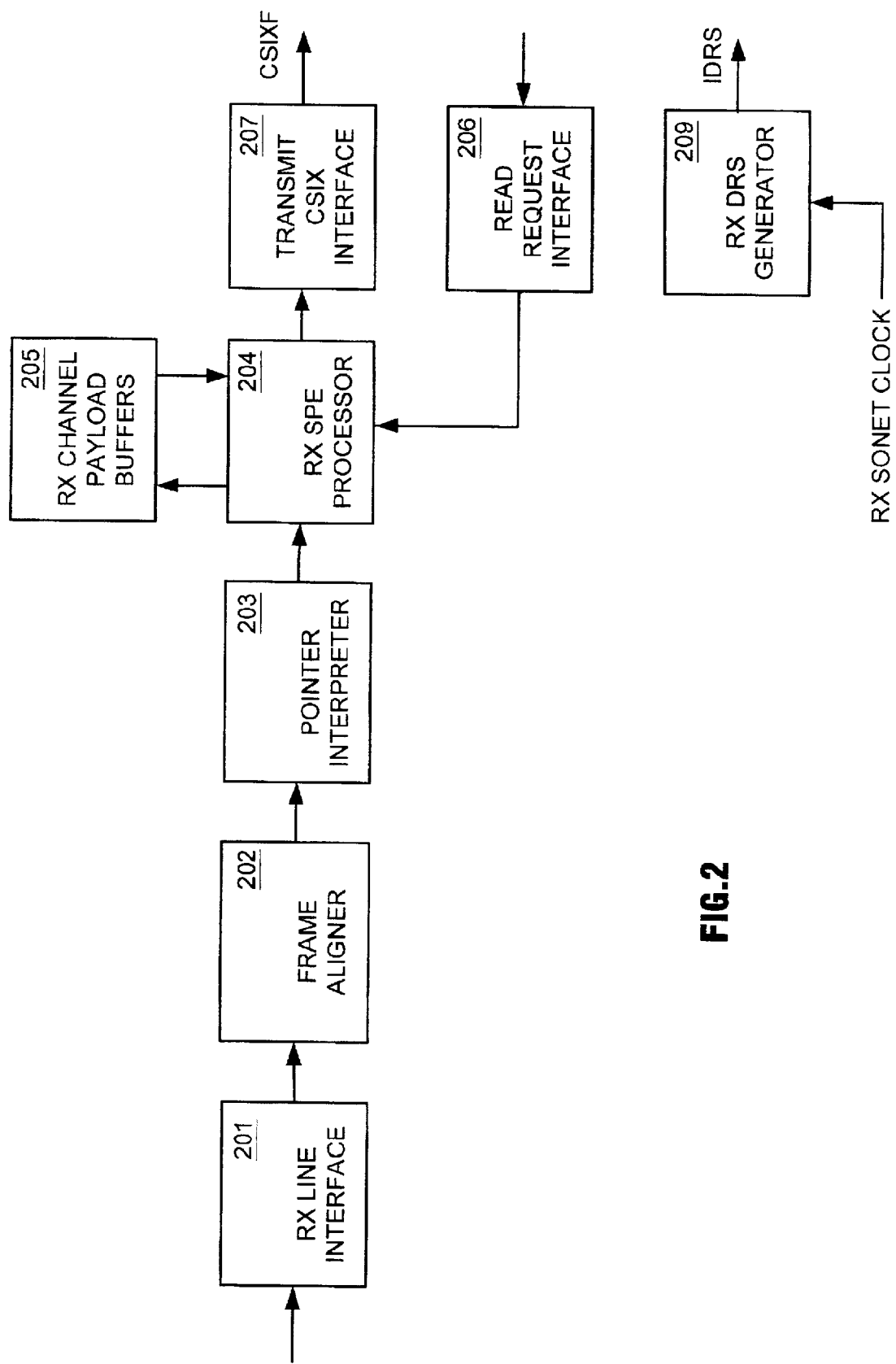
FIG. 2 illustrates a block diagram of ingress circuitry on a line card, utilizing aspects of the present invention.

FIG. 2 illustrates a block diagram of certain ingress circuitry on the line card 101. A receive (RX) line interface 201 has sixteen STS-12 receive line interfaces, so that an STS-48c channel is carried across four STS-12 interfaces while an STS-192 channel is carried across all sixteen STS-12 interfaces. Each interface receives 1-bit serial data at 622.08 MHz, performs clock recovery from the incoming data stream, and converts the serial data to 8-bit parallel data at 77.76 MHz using the recovered clock. The 8-bit parallel data is then synchronized to a local 77.76 MHz clock by writing data into a buffer using the recovered 77.76 MHz clock signal, and reading data out of the buffer using the local 77.76 MHz clock. Data read out of the synchronizing buffer is then byte aligned and frame aligned using the A1 and A2 framing bytes in the overhead section of each SONET frame.

Incoming data streams carrying STS-1 and STS-Nc channels, where N<=12, do not have to be frame-synchronous with another for them to be processed. Streams that are carrying part of an STS-Nc channel, where N>12, however, should be frame-synchronous with one another in order for them to be processed properly. Thus, four STS-12 streams carrying an STS-48c channel should be frame synchronous, and in the case of an STS-192c channel, all sixteen STS-12 streams should be frame-synchronous. After passing over the inter-chip interconnect and through the RX line interface 201, such frame-synchronous streams may lose their frame alignment. Frame aligner 202 frame-realigns these streams using a small alignment FIFO for each STS-12 stream.

Pointer interpreter 203 interprets the H1 and H2 pointer bytes in the overhead sections of SONET frames to generate STS frame timing signals that identify the start of each synchronous payload envelope (SPE) and provide SPE valid timing in the frames. In addition, the pointer interpreter 203 interprets the H3 pointer byte in the overhead sections of SONET frames to detect ingress positive and negative frequency adjustments on the channels. The pointer interpreter 203 then forwards the sixteen STS-12 streams, the SPE frame timing, and the positive and negative frequency adjustment information to an RX SPE processor 204.

The RX SPE processor 204 uses the STS frame timing signals to extract the SPE out of the STS-12 streams, and store them in receive (RX) channel payload buffers 205. In order to properly extract STS-48c and STS-192c channels out of the STS-12 streams, the STS-12 streams are passed through a time slot interchange before storing in the RX channel payload buffers 205. The time slot interchange reorders the bytes read off the STS-12 streams according to the STS-N multiplexing rules, which require an STS-12 channel to be interleaved 4-byte chunks at a time. STS-12 streams carrying STS-1 and STS-Nc channels, where N<=12, bypass the time slot interchange.

The RX channel payload buffers 205 include a payload buffer assigned to each channel. Each STS-1 has a 64-byte buffer assigned to it. For concatenated payloads, a proportional number of STS-1 buffers are concatenated to form the channel payload buffer. In addition to storing the channel SPE data, an indication of the start of each SPE is also stored in the channel payload buffer.

A read request interface 206 receives channel read requests from the switch fabric 105, stores them in a 32-deep FIFO, and forwards the channel read requests one-by-one to the RX SPE processor 204. The switch fabric 105 generates the channel read requests based on its time slot configuration for various channels. The channel read request takes the form of an 8-bit channel identification and a 1-bit channel read request valid signal transmitted through a 125 MHz bus coupling the line card 101 to the switch fabric 105.

A segmentation engine in the RX SPE processor 204 receives the channel read request forwarded by the read request interface 206, segments the requested channel's SPE data from the channel payload buffer into a payload data unit (PDU) of a time division multiplexed (TDM) cell, and inserts the TDM cell into the PDU of a protocol independent cell (PIC). Included in the PIC header is an IPFJ bit that when set by the segmentation engine indicates that a positive frequency justification had been detected on the ingress line card by the pointer interpreter 203, and an NIFJ bit that when set by the segmentation engine indicates that a negative frequency justification had been detected on the ingress line card by the pointer interpreter 203. Additional control information included in the PIC header by the segmentation engine facilitate reassembly of the data stream stored in the TDM and PIC PDU's to be reassembled back into SPE form on the egress line card 104. The PIC is then sent to the switch fabric 105 in a CSIX frame (CSIXF) through the transmit CSIX interface 207, which is responsible for transferring all ingress cell traffic to the switch fabric 105 across the industry standard CSIX interface.

An RX data rate signal (DRS) generator 209 generates an ingress data rate signal (IDRS). The ingress data rate signal represents the nominal STS-1 SPE byte data rate using the local RX SONET clock. Since the local RX SONET clock runs 12× the STS-1 byte data rate and each row of a STS-1 frame is 90 bytes long including 3 bytes for overhead and 87 bytes for SPE data, the ingress data rate signal is pulsed 87 times during a time span of 12*90 RX SONET clock pulses.

Figure 3:
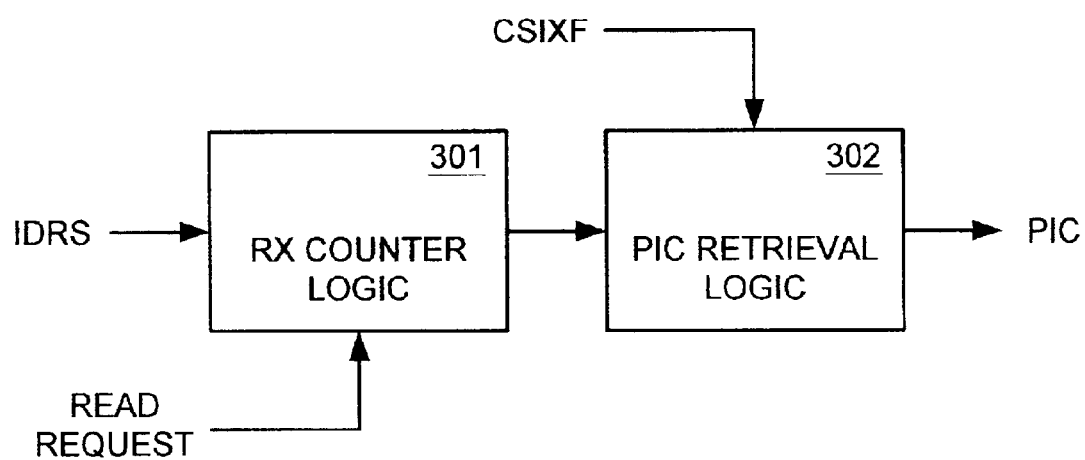
FIG. 3 illustrates a block diagram of certain interface circuitry on the ingress side of a switch fabric, utilizing aspects of the present invention.

FIG. 3 illustrates a block diagram of certain interface circuitry on the ingress side of the switch fabric 105. RX counter logic 301 includes a 5-bit ingress counter that receives and counts data rate pulses on the ingress data rate signal (IDRS) provided by the RX data rate signal generator 209. The 5-bit ingress counter is a roll-over counter that rolls over to 00000 upon receiving a next data rate pulse after being at binary 11111, and is clocked by a local 125 MHz clock. When the RX counter logic 301 receives an indication that the switch fabric has made a read request, the RX counter logic 301 provides the then current count on the 5-bit ingress counter to PIC retrieval logic 302. The PIC retrieval logic 302 receives the CSIC frame (CSIXF) from the transmit CSIX interface 207, retrieves the embedded PIC, then writes the count received from the RX counter logic 301 into the PIC header.

Figure 4:
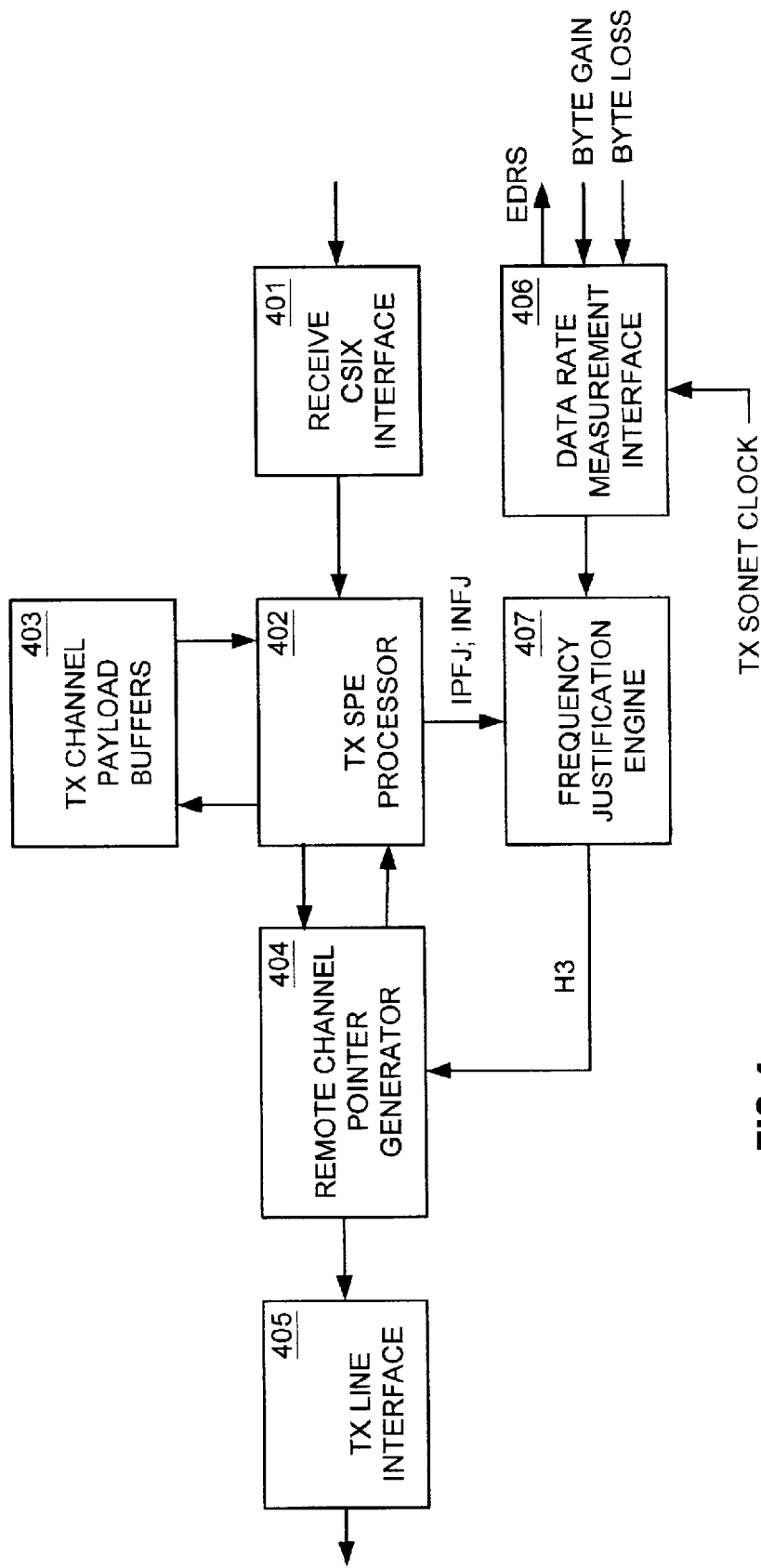
FIG. 4 illustrates a block diagram of egress circuitry on a line card, utilizing aspects of the present invention.

FIG. 4 illustrates a block diagram of certain egress circuitry on the line card 106. A receive (RX) CSIX interface 401 receives CSIX frames from the switch fabric 105, and extracts PIC cells from the CSIX frames. A transmit (TX) SPE processor 402 receives the PIC cells, and a reassembly engine in the TX SPE processor 402 reassembles the SPE data streams from the PIC cells and queues the SPE data streams in transmit (TX) channel payload buffers 403. The reassembly engine reads channel information from the PIC headers so that it can queue the SPE data streams into the proper channel buffers of the TX channel payload buffers 403. The TX SPE processor 402 also reads the positive and negative frequency justification information from the PIC headers, and forwards the information to a frequency justification engine 407.

Transmission of the SPE data from the TX channel payload buffers 403 to a remote channel pointer generator 404 is not started right away. The SPE data is accumulated in each channel buffer to a configurable threshold before transmission from that buffer is started. SPE data is read out in STS-12 multiplexed fashion in the form of sixteen STS-12 SPE data streams.

The remote channel pointer generator 404 is responsible for H1, H2 and H3 pointer generation for the channels received from the switch fabric 105. It receives sixteen STS-12 data streams from the TX SPE processor 402 along with start of SPE indications. The remote channel pointer generator 404 monitors the start of SPE indications to generate and insert the H1 and H2 pointer information for each STS-1 into the STS-12 data streams. When frequency justification need is expressed for a channel by the frequency justification engine 407, the remote channel pointer generator 404 transmits to the TX SPE processor 402 instructions to enable data reads during H3 byte times and pause data reads during the byte time for the byte following the H3 byte to satisfy the frequency justification needs.

A TX line interface 405 receives the sixteen STS-12 data streams and inserts appropriate transport overhead (TOH) bytes into the first STS-1 of every STS-12 data stream before transmission. The TX line interface 405 employs a serializer that receives the 8-bit parallel STS-12 data stream at 77.76 MHz, and outputs a differential serial STS-12 data stream at 622 MHz. Error insertion capability is also provided on the TX line interface 405.

A data rate measurement interface 406 generates an egress data rate signal (EDRS). The egress data rate signal indicates the local nominal STS-1 SPE byte data rate using the local TX SONET clock. Like the ingress data rate signal, the egress data rate signal is generated using the local 77.76 MHz SONET clock and pulsed high for two clocks to indicate receive/transmit of one byte of an STS-1 SPE. Since the local TX SONET clock runs 12× the STS-1 byte data rate and each row of a STS-1 frame is 90 bytes long including 3 bytes for overhead and 87 bytes for SPE data, the egress data rate signal is thus pulsed 87 times during a time span of 12*90 TX SONET clock pulses. Byte gain/loss adjustment information is received by the data rate measurement interface 406 from interface circuitry on the egress side of the switch fabric 105, and forwarded to the frequency justification engine 407.

The frequency justification engine 407 determines the frequency justification needs for each STS-1 or STS-Nc channel received from the switch fabric 105 by combining the ingress frequency justification information stored in the PIC headers with the byte gain/loss adjustment generated by the interface circuitry on the egress side of the switch fabric 105. The TX SPE processor 402 reads the ingress positive and negative frequency justification information from PIC header bits, IPFJ and INFJ, respectively, and provides that information to the frequency justification engine 407. The data rate measurement interface 406 receives the byte gain and loss adjustment information from the interface circuitry on the egress side of the switch fabric 105 and forwards that information to the frequency justification engine 407. The frequency justification engine 407 effectively places the ingress frequency justification information and byte gain/loss adjustment information into the same bucket. The ingress positive/negative frequency adjustments are counted by +/−1, while the byte gain/loss adjustments are counted by −/+1. The frequency justification engine 407 makes an egress justification only when the contents of the bucket become greater than or equal to +1 or less than or equal to −1. Once an adjustment is made, the contents of the bucket are adjusted with the appropriate −1 or +1.

Figure 5:
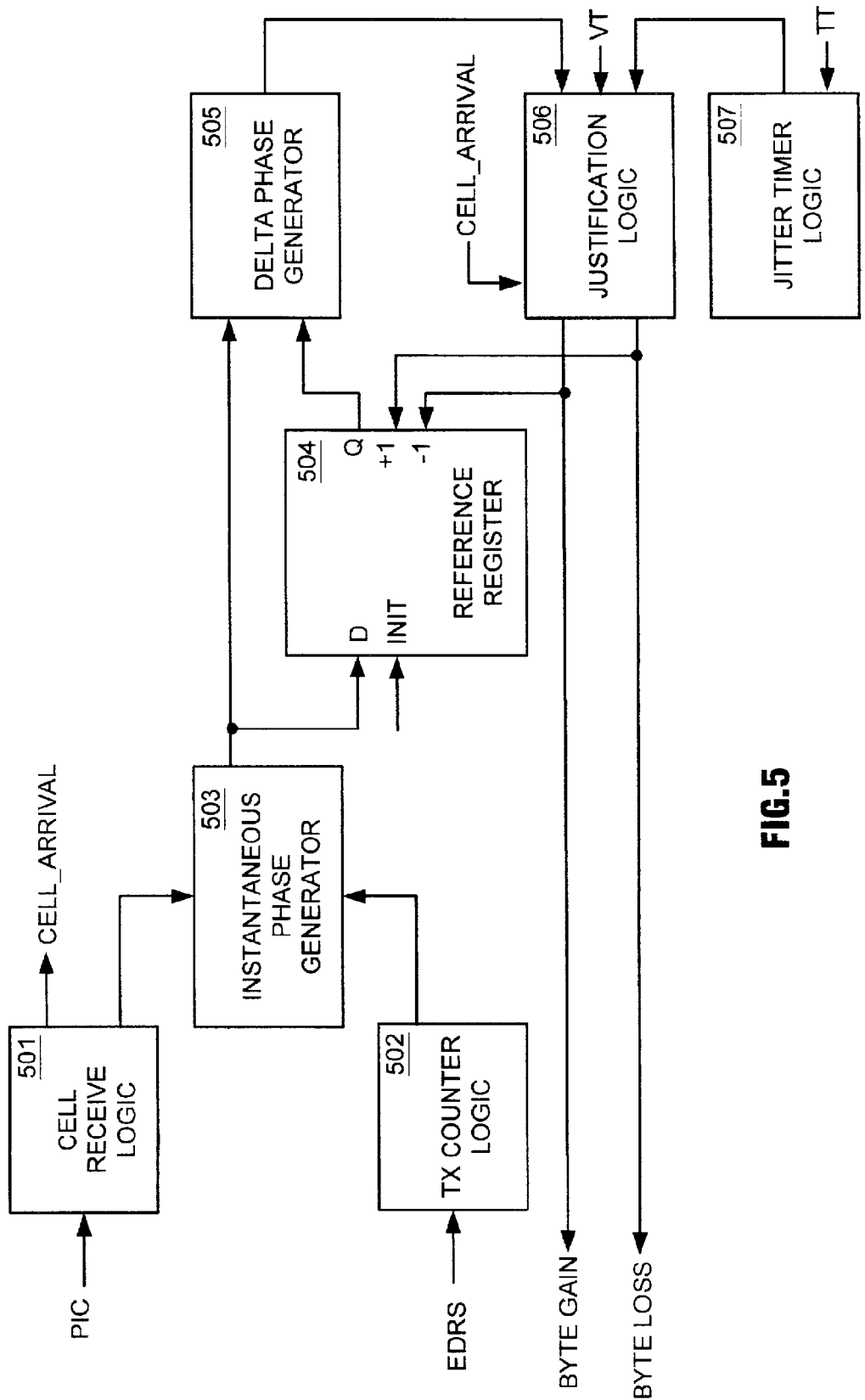
FIG. 5 illustrates a block diagram of certain interface circuitry on the egress side of a switch fabric including an apparatus for determining byte gain and loss adjustments compensating for frequency differences between ingress and egress data rate signals in a SONET/SDH network element, utilizing aspects of the present invention.

FIG. 5 illustrates a block diagram of certain interface circuitry on the egress side of the switch fabric 105 including an apparatus for determining byte gain and loss adjustments compensating for frequency differences between ingress and egress data rate signals in a SONET NE. For an STS-1 channel, when a byte gain is determined, this means that the ingress data rate signal is faster than the egress data rate signal, and that over time, an extra byte of data has accumulated on the egress line card, requiring a negative frequency adjustment so that the extra byte may be transported in the H3 byte in a SONET frame. On the other hand, when a byte loss is determined, this means that the ingress data rate signal is slower than the egress data rate signal, and that over time, an extra byte of data has been transmitted from the egress line card, requiring a positive frequency adjustment so that no SPE byte of data will be transmitted in the byte following the H3 byte in a SONET frame. For an STS-Nc channel, frequency adjustments are proportional to the size of the channel.

Cell receive logic 501 receives each PIC passed through the switch fabric 105. Upon receiving each PIC, the cell receive logic 501 generates a cell arrival indication (CELL_ARRIVAL) and reads the ingress data rate signal count stored in the PIC header. As previously described, the ingress data rate signal count stored in the PIC header is the count of the ingress 5-bit counter at the time a read request for the SPE in the PIC PDU was received by the ingress line card 101 from the switch fabric 105.

TX counter logic 502 includes a 5-bit egress counter that receives and counts data rate pulses on the egress data rate signal (EDRS) received from the data rate measurement interface 406 of the egress line card 104. The 5-bit egress counter is a roll-over counter that rolls over to 00000 upon receiving a next data rate pulse after being at binary 11111, and is clocked by a local 125 MHz clock.

An instantaneous phase generator 503 receives the ingress data rate signal count from the cell receive logic 501 and the egress data rate signal count generated by the TX counter logic 502, and generates an instantaneous phase from a difference between the ingress and egress data rate signal counts so as to indicate a frequency difference between the ingress and egress data rate signals at the time of the PIC cell arrival (i.e., upon passing the data through the switch fabric 105). The instantaneous phase is provided to inputs of a reference register 504 and delta phase generator 505.

The reference register 504 generates a reference phase that is provided to another input of the delta phase generator 505. The reference phase is set at an initialization time to be equal to the instantaneous phase being provided at that time to an input (D) of the reference register 504, by activating an initialization signal provided to an initialization input (INIT) of the reference register 504. The initialization time is preferably concurrent with a PIC arrival event.

The delta phase generator 505 generates a delta phase indicative of a difference between the instantaneous phase being provided to one of its inputs and the reference phase being provided to another of its inputs. Since the reference phase is initially set equal to the instantaneous phase at the initialization time, the delta phase is equal to zero at that time. Subsequently, as the instantaneous phase changes, the delta phase changes accordingly.

Justification logic 506 is a state machine that receives the delta phase generated by the delta phase generator 505, the cell arrival indicator (CELL_ARRIVAL) generated by the cell receive logic 501, and a jitter tick (JITTER_TICK) generated by jitter timer logic 507. The justification logic 506 activates a byte gain output (BYTE GAIN) when delta phases at cell arrival times continuously exceed a positive value threshold (+VALUE_THRESHOLD) for at least a time threshold period, and activates a byte loss output (BYTE LOSS) when delta phases at cell arrival times continuously are less than a negative value threshold (−VALUE_THRESHOLD) for at least the time threshold period. The byte gain output (BYTE GAIN) is coupled to an decrement input (−1) of the reference register 504 so that when the byte gain output is activated, the reference phase is decremented by one, and the byte loss output (BYTE LOSS) is coupled to an increment input (+1) of the reference register 504 so that when the byte loss output is activated, the reference phase is incremented by one.

The jitter timer logic 507 generates a jitter tick (JITTER_TICK) once each time threshold period. Values for the value threshold (VT or VALUE_THRESHOLD) and time threshold period (TT or TIME_THRESHOLD) can be determined by analyzing the potential for jitter in a particular SONET NE implementation. Appropriate values would eliminate false byte gain and loss adjustments triggered by the switch fabric or clock timing induced jitter. In the current implementation where the ingress and egress data rate signals are pulsed high for two 77.76 MHz clocks to indicate receive/transmit of one byte of an STS-1 SPE and asserted 29 times during every period of 360 77.76 MHz clocks, a value threshold of 2 and time threshold of 209.28 microseconds is employed.

Also included in the interface circuitry on the egress side of the switch fabric 105 is logic (not shown) that encapsulates PIC cells into CSIX frames for transmission to the egress line card 104. As previously mentioned, the switch fabric 105 communicates with line cards 101~104 through the industry standard CSIX interface.

Figure 6:
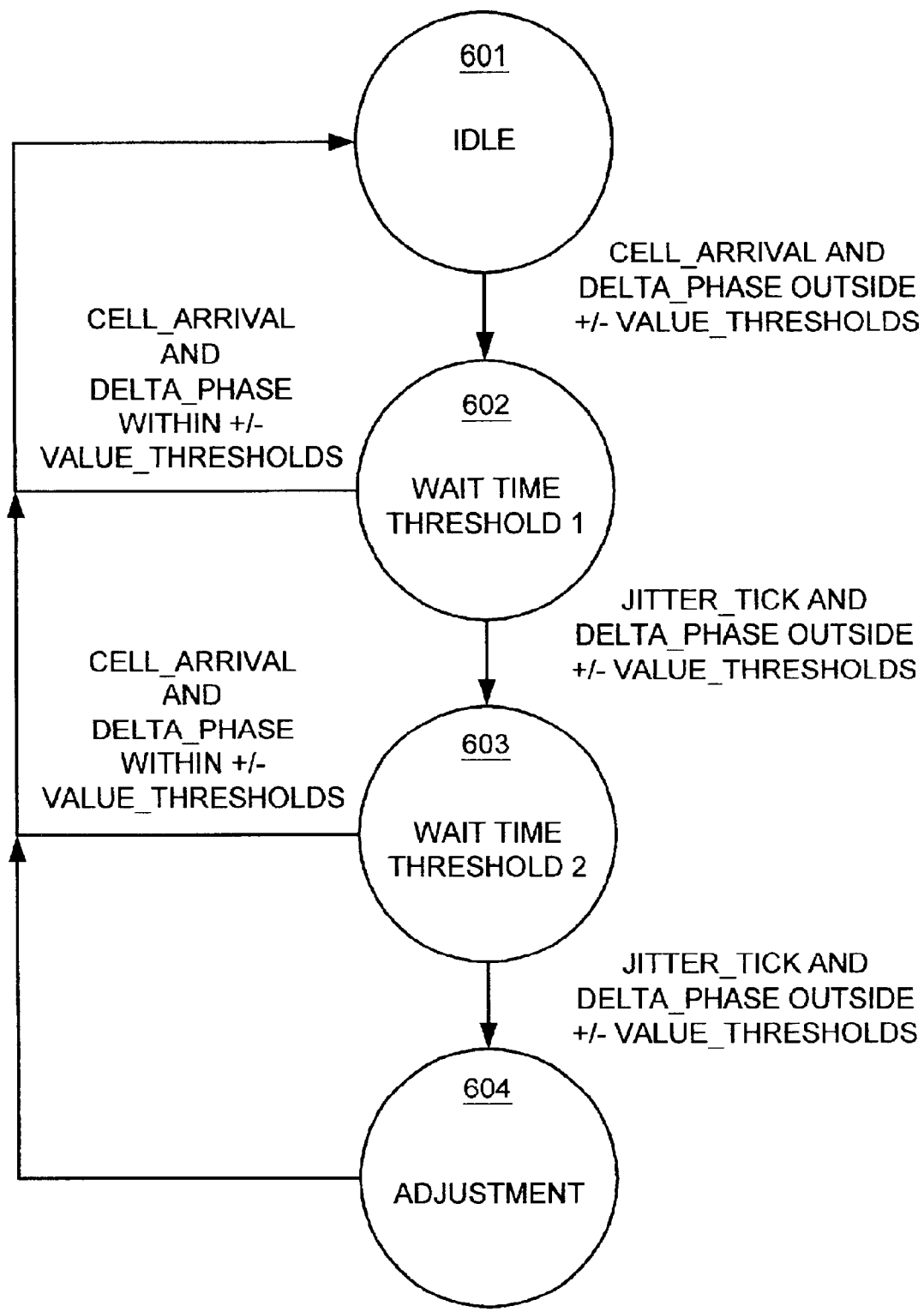
FIG. 6 illustrates a state diagram for justification logic, utilizing aspects of the present invention.

FIG. 6 illustrates a state diagram for the justification logic 506. If the magnitude of the delta phase (DELTA_PHASE) is greater than the magnitude of the value threshold (VALUE_THRESHOLD) at the time of any cell arrival event as indicated by the cell arrival indication (CELL_ARRIVAL), then the state changes from the idle state 601 to a first time threshold wait state 602. If the magnitude of the delta phase (DELTA_PHASE) becomes less than the magnitude of the value threshold (VALUE_THRESHOLD) at the time of any subsequent cell arrival event occurring before receipt of a jitter tick from the jitter timer logic 507, then the state changes back to the idle state 601. On the other hand, if the magnitude of the delta phase (DELTA_PHASE) remains greater than the magnitude of the value threshold (VALUE_THRESHOLD) at the time of all subsequent cell arrival events up to and including the receipt of a jitter tick, then the state changes to a second time threshold wait state 603. If the magnitude of the delta phase (DELTA_PHASE) becomes less than the magnitude of the value threshold (VALUE_THRESHOLD) at the time of any cell arrival event occurring before receipt of a second jitter tick, then the state changes back to the idle state 601. On the other hand, if the magnitude of the delta phase (DELTA_PHASE) remains greater than the magnitude of the value threshold (VALUE_THRESHOLD) at the time of all cell arrival events up to and including the receipt of a second jitter tick, then the state changes to the adjustment state 604. In 604, the byte gain output (BYTE GAIN) is activated if the sign of the delta phase is positive, and the byte loss output (BYTE LOSS) is activated if the sign of the delta phase is negative.

Figure 7:
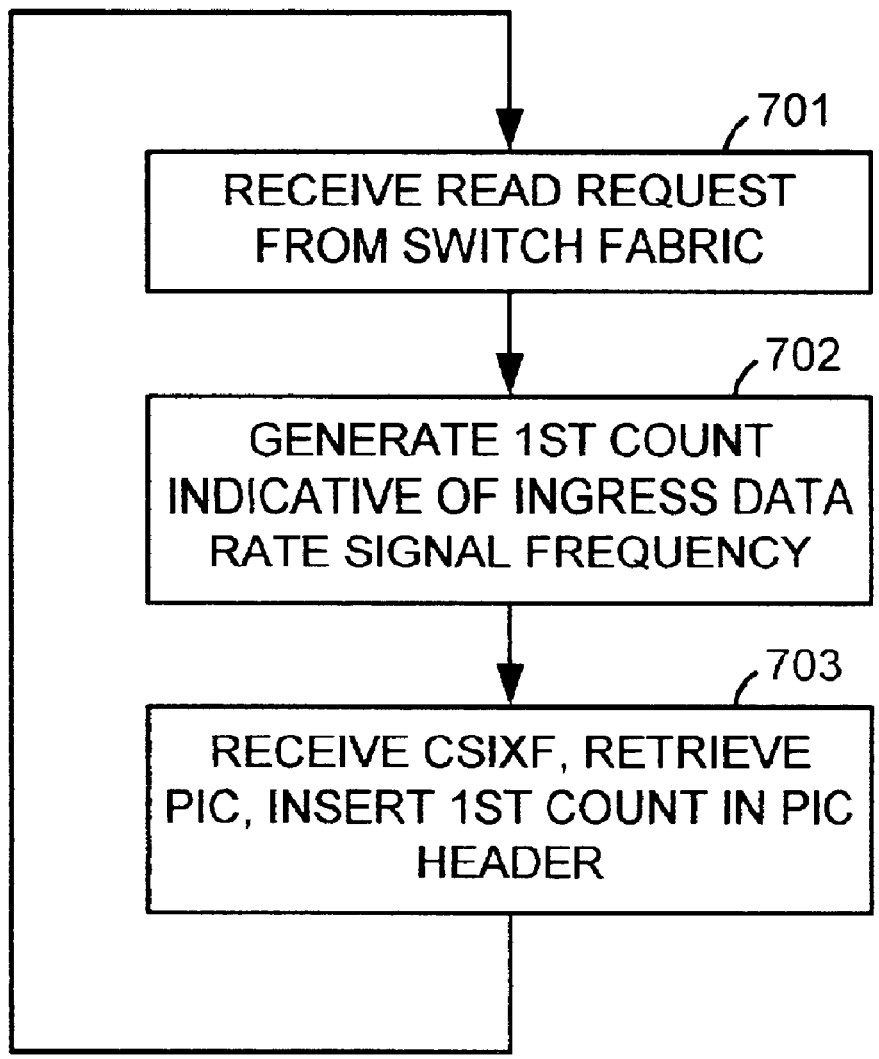
FIG. 7 illustrates a flow diagram of a switch fabric ingress side interface portion of a method determining byte gain and loss adjustments compensating for frequency differences between ingress and egress data rate signals in a SONET/SDH NE, utilizing aspects of the present invention.

FIG. 7 illustrates a flow diagram of a switch fabric ingress side interface portion of a method determining byte gain and loss adjustments compensating for frequency differences between ingress and egress data rate signals in a SONET NE. As the interface circuitry on the ingress side of the switch fabric 105 receives the ingress data rate signal (IDRS) from the RX data rate signal generator 209, CSIX frames from the Transmit CSIX interface 207 and channel read requests from the switch fabric 105, the method loops through 701~703. In 701, a channel read request is received from the switch fabric 105. In 702, a first count indicative of an ingress data rate signal frequency (IDRS) is generated upon each such read request by the RX counter logic 301. In 703, a CSIX frame (CSIXF) is received from the transmit CSIX interface 207, the embedded PIC is retrieved, and the first count inserted into a reserved location in the PIC header.

Figure 8:
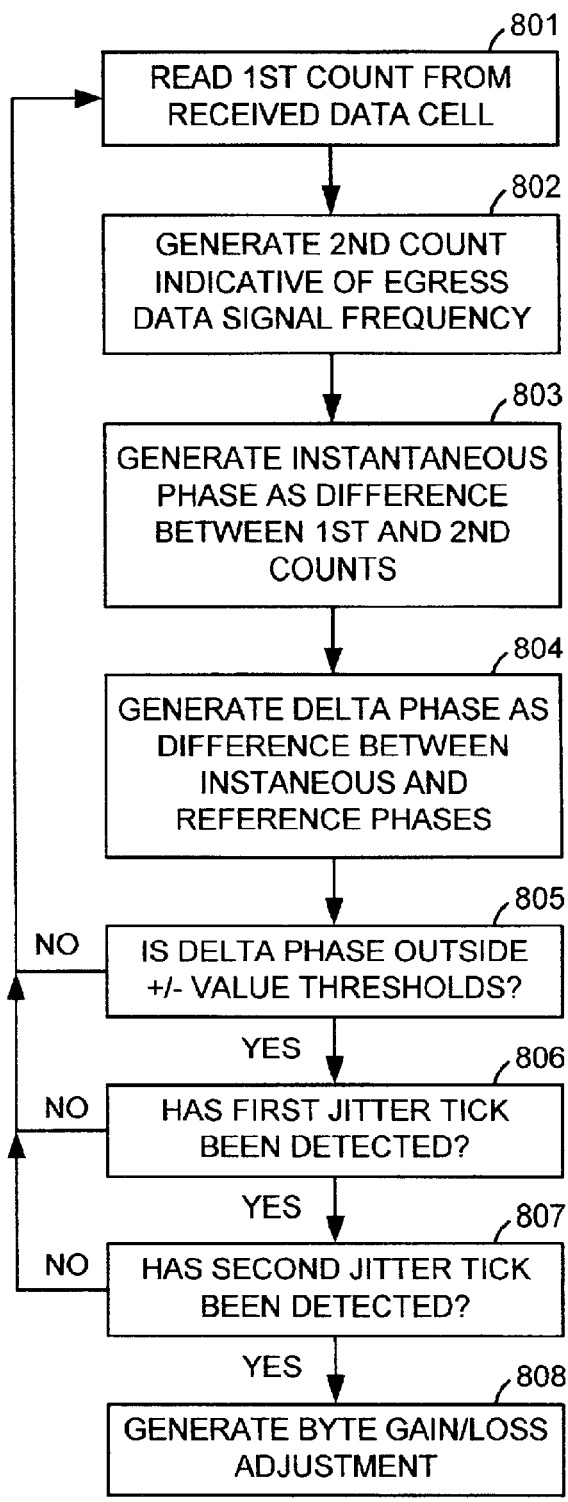
FIG. 8 illustrates a flow diagram of a switch fabric egress side interface portion of a method for determining byte gain and loss adjustments compensating for frequency differences between ingress and egress data rate signals in a SONET/SDH NE, utilizing aspects of the present invention.

FIG. 8 illustrates a flow diagram of a switch fabric egress side interface portion of a method for determining byte gain and loss adjustments compensating for frequency differences between ingress and egress data rate signals in a SONET NE. The method performs 801~809 as requested channel data are received by the interface circuitry on the egress side of the switch fabric 105.

In 801, cell receive logic 501 reads a first count included in a PIC header of a PIC passed through the switch fabric 105. The first count is indicative of the ingress data rate signal frequency. In 802, a second count is generated by TX counter logic 502. The second count is indicative of the egress data rate signal frequency. In 803, an instantaneous phase is generated from a difference between the first and second counts so as to indicate frequency differences between the ingress and egress data rate signals at the time of the PIC cell arrival. In 804, a delta phase (DELTA_PHASE) equal to the difference between the instantaneous phase and a reference phase is generated, wherein the reference phase had been initialized by setting the reference phase equal to the instantaneous phase at some prior point in time so that the delta phase at that time was equal to zero.

In 805, a determination is made whether the delta phase is greater than a positive value threshold (+VALUE_THRESHOLD) or less than a negative value threshold (−VALUE_THRESHOLD). If the answer is NO in both cases, then the method jumps back to 801.

On the other hand, if the answer is YES, then in 806, a determination is made whether a first jitter tick has been received while the delta phase has been continuously greater than the positive value threshold or less than the negative value threshold, as the case may be, up to and including the time of the first jitter tick. If the first jitter tick had not been received, the method jumps back to 801 to continue receiving additional PIC cells passed through the switch fabric 105. On the other hand, if the first jitter tick had been received, in 807, a determination is then made whether a second jitter tick has been received while the delta phase has been continuously greater than the positive value threshold or less than the negative value threshold, as the case may be, up to and including the time of the second jitter tick. If the second jitter tick had not been received, the method jumps back to 801 to continue receiving additional PIC cells passed through the switch fabric 105. On the other hand, if the second jitter tick had been received, in 808, a byte gain adjustment is generated if the delta phase has continuously been greater than the positive value threshold for the period and a byte loss adjustment is generated if the delta phase has been continuously less than the negative value threshold for the period.

Figure 9:
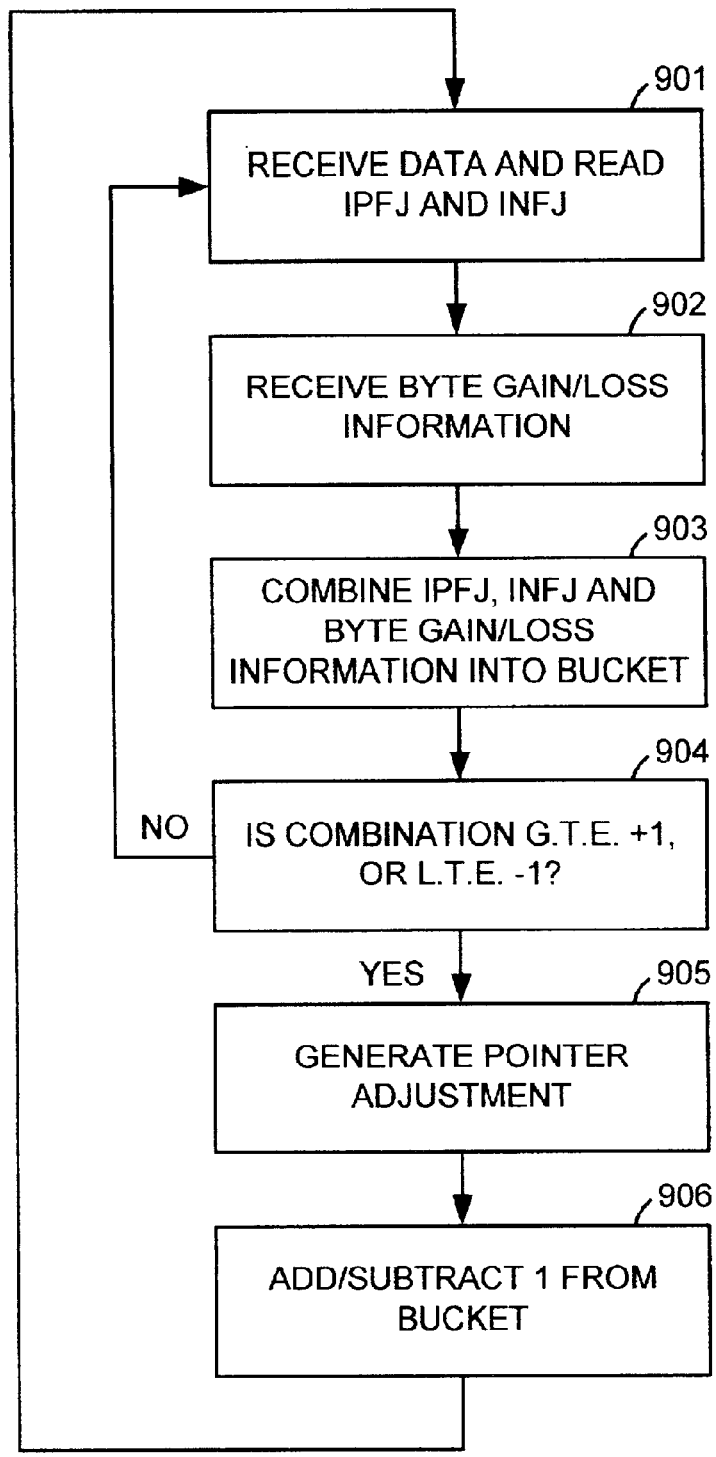
FIG. 9 illustrates a flow diagram of an egress line card portion of a method for determining periodic adjustments of the pointer bytes in outgoing SONET/SDH frames, utilizing aspects of the present invention.

FIG. 9 illustrates a flow diagram of an egress line card portion of a method for determining periodic adjustments of the pointer bytes in outgoing SONET frames. As channel data are received by the egress line card 104 from the switch fabric 105, the egress portion of the method loops through 901~906. In 901, a CSIX frame is received from the switch fabric 105, and the TX SPE processor 402 reads the positive frequency justification IPFJ and negative frequency justification INFJ bits in the PIC header of the PIC embedded in the CSIX frame and passes the frequency justification information contained therein to the frequency justification engine 407. In 902, the data rate measurement interface 406 receives byte gain/loss adjustment information from the interface circuitry on the egress side of the switch fabric 105, and passes that information to the frequency justification engine 407. In 903, the frequency justification information and the byte gain/loss information are effectively combined in a "bucket" that is typically implemented with conventional counter logic.

In 904, a determination is made whether the contents of the "bucket" is greater than or equal to +1 or less than or equal to −1. If the contents of the "bucket" are not greater than or equal to +1 nor less than or equal to −1, then the method jumps back to 901 to handle the next CSIX frame from the switch fabric 105. On the other hand, if the contents of the "bucket" are greater than or equal to +1 or less than or equal to −1, then in 905, the frequency justification engine 407 notifies the remote channel pointer generator 404 to make an H3 pointer adjustment for N SPE byte gains if the contents of the "bucket" are greater than or equal to +1, or for N SPE byte losses if the contents of the "bucket" are less than or equal to −1. In 906, the contents of the "bucket" are then adjusted by the frequency justification engine 907 subtracting 1 from the contents if an N SPE byte gain adjustment had been made in 905, or adding 1 to the contents if an N SPE byte loss adjustment had been made in 905.

Although the various aspects of the present invention have been described with respect to a preferred embodiment, it will be understood that the invention is entitled to full protection within the full scope of the appended claims.

We claim:

1. An apparatus for determining byte gain and loss adjustments compensating for frequency differences between ingress and egress data rate signals in a SONET network element, comprising:
   a first counter generating a first count indicative of a frequency of an ingress data rate signal upon each request to transmit data to a switch fabric;
   a second counter generating a second count indicative of a frequency of an egress data rate signal; and
   an instantaneous phase generator generating an instantaneous phase from a difference between said first and second counts so as to indicate frequency differences between said ingress and egress data rate signals upon passing said data through the switch fabric.

2. The apparatus according to claim 1, wherein said first count is transmitted along with data after each request to transmit said data to said switch fabric.

3. The apparatus according to claim 2, wherein said data is transmitted to said switch fabric in a protocol independent cell, and said first count is included in a header of said protocol independent cell.

4. The apparatus according to claim 1, further comprising:
   a reference register having a first input coupled to said instantaneous phase, a second input for setting a reference phase, and an output providing said reference phase; and
   a delta phase generator having a first input coupled to said instantaneous phase, a second input coupled to said reference phase, and an output providing a delta phase equal to a difference between said instantaneous phase and said reference phase.

5. The apparatus according to claim 4, wherein said reference phase is set at an initialization time to be equal to said instantaneous phase at said initialization time.

6. The apparatus according to claim 4, wherein said reference register further has an increment input to increment said reference phase upon each byte loss adjustment, and a decrement input to decrement said reference phase upon each byte gain adjustment.

7. The apparatus according to claim 4, further comprising justification logic having a first input coupled to said delta phase, a second input receiving a data arrival signal indicating when data has arrived from said switch fabric, a first output providing a byte gain adjustment indication if said delta phase is greater than a positive value threshold when said data arrival signal indicates that data has arrived from said switch fabric, and a second output providing a byte loss adjustment indication if said delta phase is less than a negative value threshold when said data arrival signal indicates that data has arrived from said switch fabric.

8. The apparatus according to claim 7, wherein said justification logic first output provides said byte gain adjustment indication only if said delta phase remains greater than said positive value threshold for a time threshold period, and said justification logic second output provides said byte loss adjustment indication only if said delta phase remains less than said negative value threshold for said time threshold period.

9. The apparatus according to claim 8, wherein said reference register further has an increment input coupled to said justification logic first output, and a decrement input coupled to said justification logic second output.

10. An apparatus for determining byte gain and loss adjustments compensating for frequency differences between ingress and egress data rate signals in a SONET network element, comprising:
   means for generating a first count indicative of a frequency of an ingress data rate signal upon each grant to transmit data to a switch fabric;
   means for generating a second count indicative of a frequency of an egress data rate signal; and
   means for generating an instantaneous phase from a difference between said first and second counts so as to indicate frequency differences between said ingress and egress data rate signals upon passing said data through the switch fabric.

11. The apparatus according to claim 10, wherein said first count is transmitted along with data after each request to transmit data to said switch fabric.

12. The apparatus according to claim 11, further comprising:
   means for generating a delta phase indicative of a difference between said instantaneous phase and a reference phase;
   means for generating a byte gain adjustment indication only if said delta phase remains greater than a positive value threshold for a time threshold period; and means for generating a byte loss adjustment indication only if said delta phase remains less than a negative value threshold for said time threshold period.

13. A method for determining byte gain and loss adjustments compensating for frequency differences between ingress and egress data rate signals in a SONET network element, comprising:

generating a first count indicative of a frequency of an ingress data rate signal upon each grant to transmit data to a switch fabric;

generating a second count indicative of a frequency of an egress data rate signal; and generating an instantaneous phase from a difference between said first and said second counts so as to indicate frequency differences between said ingress and egress data rate signals upon passing said data through the switch fabric.

14. The method according to claim 13, further comprising transmitting said first count along with data after each request to transmit data to said switch fabric.

15. The method according to claim 14, wherein said data is transmitted to said switch fabric in a protocol independent cell, and said first count is included in a header of said protocol independent cell.

16. The method according to claim 13, further comprising generating a delta phase indicative of a difference between said instantaneous phase and a reference phase.

17. The method according to claim 16, further comprising setting said reference phase to be equal to said instantaneous phase at an initialization time.

18. The method according to claim 16, further comprising:

generating a byte gain adjustment indication if said delta phase is greater than a positive value threshold when a data arrival signal indicates that data has arrived from said switch fabric; and generating a byte loss adjustment indication if said delta phase is less than a negative value threshold when said data arrival signal indicates that data has arrived from said switch fabric.

19. The method according to claim 18, further comprising:

generating said byte gain adjustment indication only if said delta phase remains greater than said positive value threshold for a time threshold period; and generating said byte loss adjustment indication only if said delta phase remains less than said negative value threshold for said time threshold period.

20. The method according to claim 19, further comprising:

incrementing said reference phase upon generation of a byte loss adjustment indication; and decrementing said reference phase upon generation of a byte gain adjustment indication.

* * * * *